Patented Jan. 24, 1950

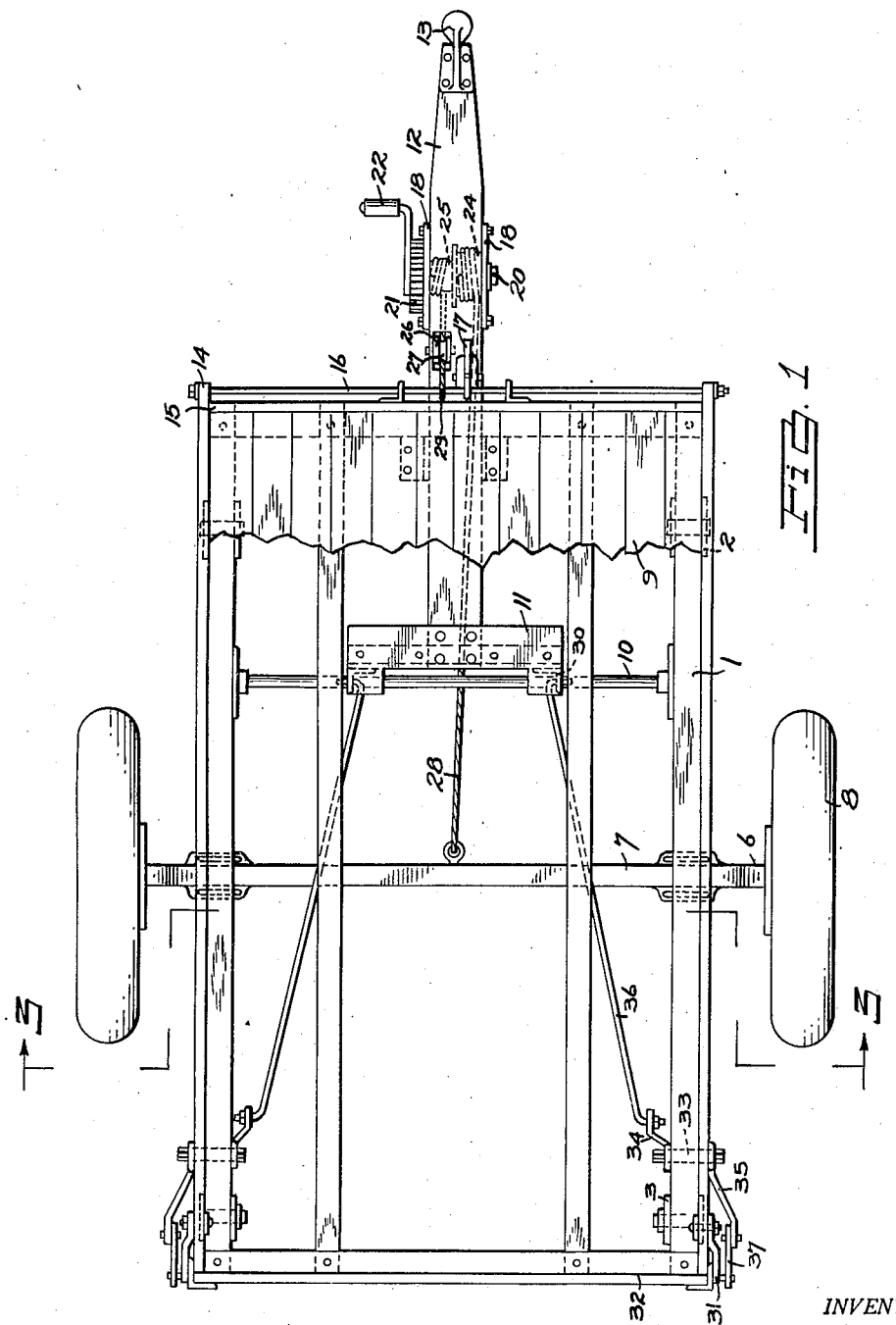

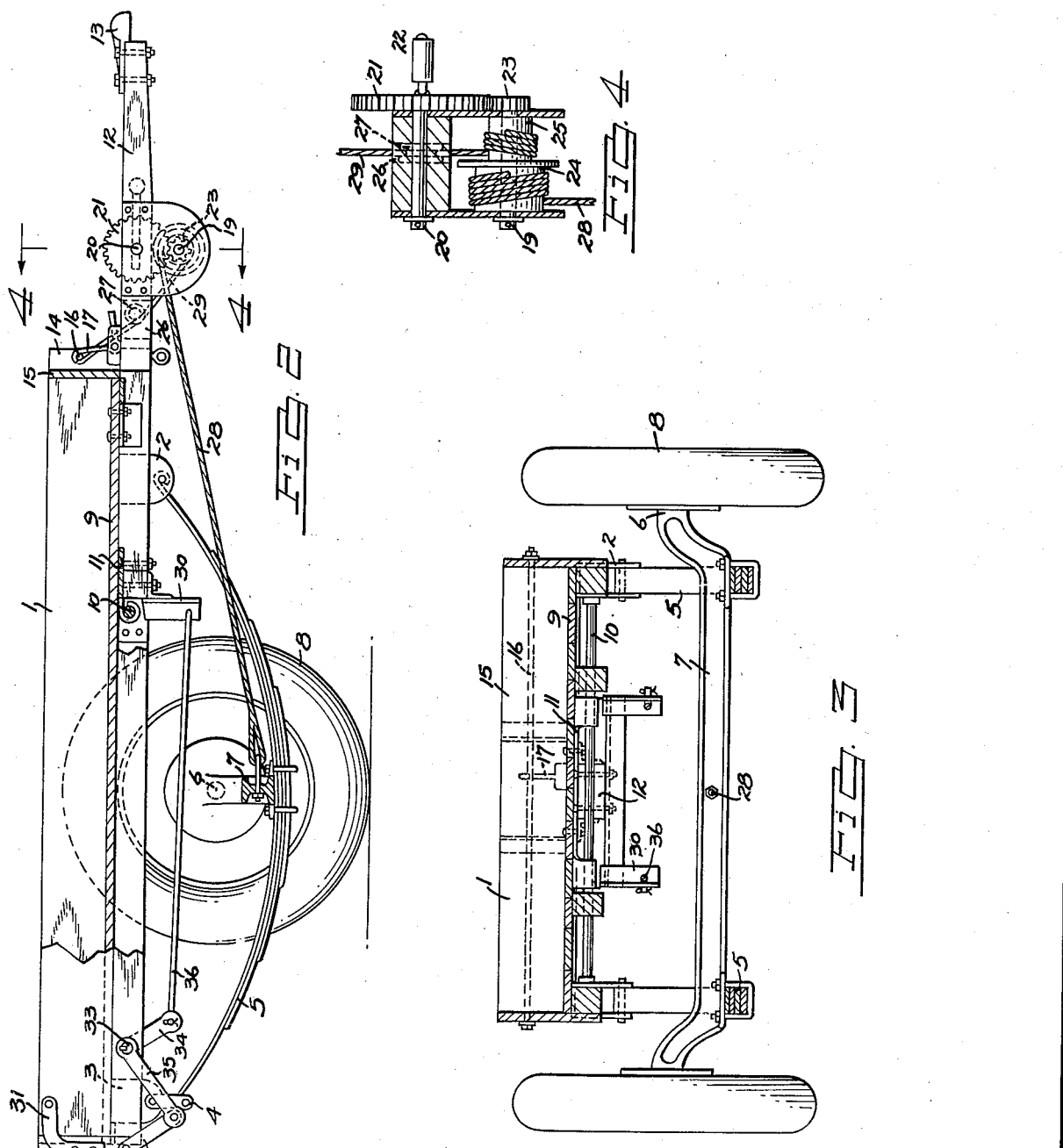

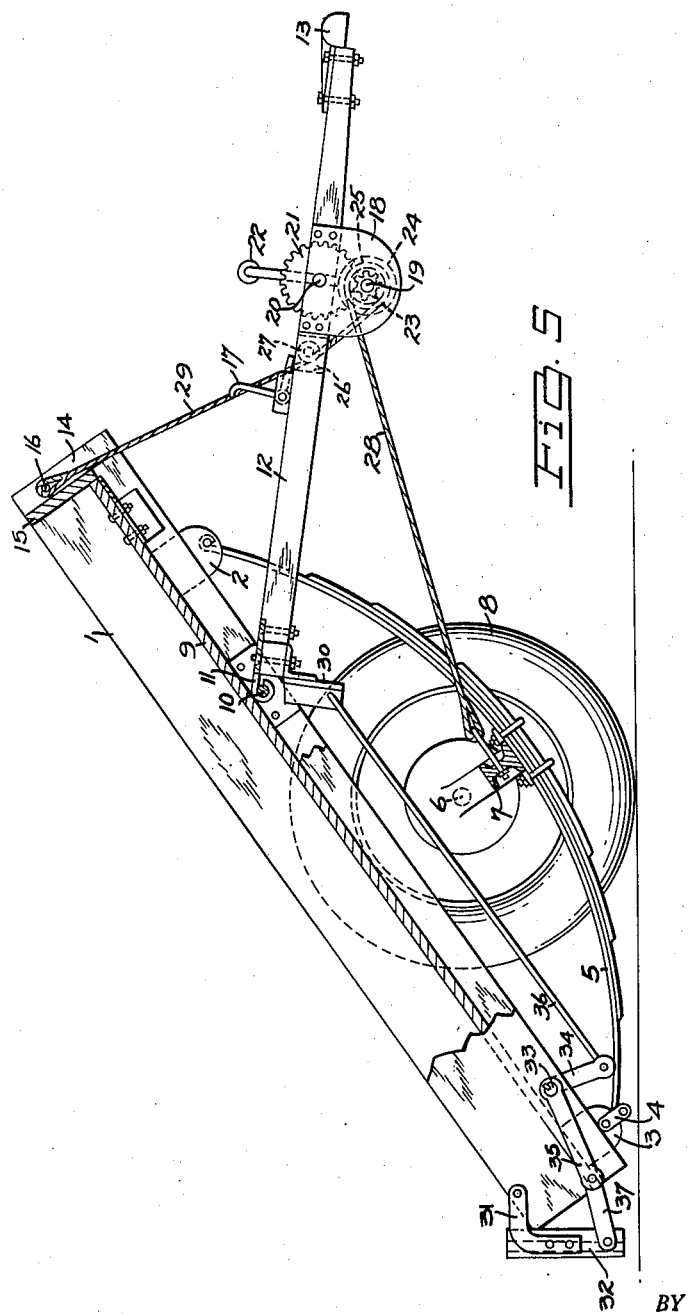

2,495,354

UNITED STATES PATENT OFFICE 2,495,354

DUMP TRAILER

Leonard N. Spearing, Detroit, and
William Hyvari, Tuscarora, Mich.

Application August 17, 1948, Serial No. 44,605

5 Claims. (Cl. 298—5)

1

This invention relates to improvements in dump trailers adapted to be hauled by any preferred type of vehicle.

It is an object of the invention to provide a dump trailer including a body supported on an axle having an offset portion, and a tongue pivotally connected to the body forwardly of the axle so that by pulling the offset portion of the axle forward relative to the tongue the body is turned about its pivot connection with the latter and the front extremity of the body is raised.

Another object of the invention is to provide such a dump trailer wherein means are provided for rotating a drum mounted on the tongue and winding a cable thereonto; the outer extremity of the latter is secured to the offset portion of the axle so that when the drum is turned in one direction the offset portion of the axle is drawn forward and the body is rearwardly and downwardly tilted.

A further object of the invention is to provide a dump trailer wherein means are provided both for limiting the tilting action of the body and for returning the latter to its horizontal position.

Another object of the invention is to provide a dump trailer including a body having a pivotally mounted tail board, a tongue pivoted to the body, and projections from the tongue so connected to the tail board that as the body is moved pivotally the tail board is swung either to open or closed position.

Having thus briefly stated some of the objects and advantages of the invention we will now describe a preferred embodiment thereof with the aid of the accompanying drawings, in which:

Figure 1 is a plan view of the invention, and

Figure 2 is a side view thereof, partly in section.

Figure 3 is a section on the line 3—3 of Figure 1.

Figure 4 is an enlarged section on the line 4—4 of Figure 2, and

Figure 5 is a side view, partly in section, showing the body in dumping position.

Referring to the drawings, 1 designates the body of a dump trailer on both sides of which downwardly projecting front and rear hangers 2 and 3 are secured and pivoted on the rear hangers 3 are short links 4. Pivotally mounted on the front hangers 2 and on the links 4 are opposite extremities of laminated springs 5. 6 denotes an angle having a depressed central portion 7; wheels 8 are mounted for rotation on opposite extremities of the said axle. The latter preferably extends beneath the body 1 somewhat nearer the rear of the latter than the front. Secured to each extremity of the depressed central portion 7 of the axle, and in the present instance extending beneath the axle, is the central portion of the spring 5.

Mounted on opposite sides of the body 1 between the axle 6 and the front of the said body, and extending beneath the flooring 9 of the latter, is a fulcrum rod 10. Pivoted on the latter centrally of the width of the body is a supporting plate 11 to which the rear extremity of a tongue 12 is rigidly secured. This tongue projects forwardly beyond the body 1 and is provided at its front extremity with any preferred means 13 for attachment to a vehicle (not shown) by which the trailer is to be towed.

Secured at its extremities to members 14 positioned forwardly of the front vertical wall 15 of the body and on opposite sides of the latter is a retaining rod 16. Mounted on the tongue 12 is a conventional movable latch 17 which normally engages the rod 16 and holds the body 1 parallel with the said tongue; when the latch is disengaged from the said retaining rod the body may be tipped about the fulcrum rod 10.

Mounted on opposite sides of the tongue 12 intermediately of its length and projecting downwardly therefrom are opposed bearing plates 18 which support opposite ends of a shaft 19 beneath the tongue. Extending through the latter and the said plates 18 and supported for rotation thereby parallel with and above the shaft 19 is another shaft 20 having a gear 21 thereon and a crank 22 by rotation of which the said gear is turned. Fixed on the shaft 19 is a pinion 23 which meshes with the gear 21, and secured around the said shaft 19 are a larger drum 24 and a smaller drum 25. Formed through the tongue 12 intermediately of its width and rearwardly of the shaft 20 is a vertical aperture 26 having a roller 27 mounted therein above an axis parallel with the axis of the said shaft 20.

Wound in opposite directions around the drums 24 and 25 are cables 28 and 29 respectively. The cable 28 at its outer extremity is secured to the central depressed portion 7 of the axle so that when the shaft 20 is rotated in one direction this depressed central portion is pulled forwardly, thereby causing the front extremity of the body 1 to tilt upwardly about the fulcrum rod 10; at the same time the other cable 29, which passes around the roller 27 and through the aperture 26 and is attached at its outer extremity to the retaining rod 16, is payed out, thereby permitting the front extremity of the body to assume its elevated position. When the shaft 20 is turned in the opposite direction the cable 28 is wound back onto the drum 25 and the front extremity of the body 1 is pulled down onto the tongue 12. Obviously, if desired, the drum 25 and cable 29 may be omitted, however, in cases where the body is to be returned to its horizontal position after dumping only part of its load, particularly if the remaining portion of the load is toward the back of the body, inclusion of the cable renders it easier to return the body to its horizontal position. Moreover the cable 29 limits the upward movement of the front extremity of the body and is therefore useful if the load is to be gradually discharged as the trailer is drawn slowly along.

Carried by and beneath opposite extremities of the supporting plate 11 and extending substantially vertically beneath the fulcrum rod 10 are fixed projections 30. Pivoted on each side of the body 1 toward the top thereof and adjacent its rear extremity are hinge plates 31 which are secured to opposite sides of a tail board 32 toward the top thereof so that as the plates 31 swing in one direction about their axes the lower extremity of the tail board swings away from the back of the flooring 9 and permits the contents of the body to be dumped. Mounted for rotation through each side of the body 1 and beneath the flooring 9 is a pin 33 having an arm 34 fixed on its inner extremity and a second arm 35 fixed on its outer extremity; it will be noted that the two arms 34 and 35 of each pair are arranged substantially at right angles to one another. Pivoted on the projections 30 and extending outwardly and rearwardly therefrom are reach rods 36 which are pivotally secured at their opposite extremities to the arms 34. Pivotally connected to the outer extremity of each arm 35 is a link 37 which is also connected to the lower extremity of the tail board 32 so that as the body 1 is raised from its horizontal position shown in Figure 2 to its dumping position shown in Figure 5 the tail board is automatically raised about the axis of the hinge plates 31.

While in the foregoing the preferred embodiment of the invention has been described and shown it is understood that alterations and modifications may be made thereto provided the said alterations and modifications fall within the scope of the appended claims.

What we claim is:

1. A dump trailer including an axle having wheels thereon and an offset portion, springs supporting the body on the axle, a tongue extending forward from beneath the body normally substantially parallel with the latter, said body being pivoted on the tongue forwardly of the axle, a drum rotatably mounted on the tongue, means for turning the drum, and a cable wound on the drum and connected at its outer extremity to the offset portion of the axle, whereby upon rotation of the drum the said offset portion is adapted to be drawn forward relative to the tongue thereby causing rotation of the body about its pivot mounting of the tongue and thereby raising the front extremity of the latter.

2. The combination in claim 1 including means for gradually increasing the maximum permissible upward movement of the front of the body as the offset portion of the axle is pulled forward.

3. The combination in claim 1, including means for lowering the front extremity of the body until it is substantially parallel with the tongue as the tongue is turned in the opposite direction.

4. A dump trailer including a body, a centrally offset axle having wheels thereon extending transversely beneath the body intermediately of the length of the latter, means supporting the body on the axle, a tongue pivoted to the body forwardly of the axle and extending forward beyond said body, releasable means for holding the body parallel with the tongue, drums mounted for rotatiton on the tongue, means for turning both the latter, a cable wound on each drum, the outer extremity of one cable being secured to the offset portion of the axle and the outer extremity of the other cable being secured to the front of the body, whereby upon rotatiton of the drums the offset portion of the axle is adapted to be drawn forward relative to the tongue by one cable to tilt the body about its axis on the tongue, and the other cable limits the upward swing of the front of the body.

5. A dump trailer including a body, an axle having a central offset portion, springs supporting the body on the axle, a tongue beneath the body and projecting forward therefrom, said body being pivoted on the tongue forwardly of the axle about a transverse horizontal axis, a drum rotatably mounted on the tongue, means for pulling the offset portion of the axle forward relative to the tongue when the drum is turned in one direction and tilting the body about its axis on the tongue, projections on the tongue, arms pivoted on the body adjacent the rear thereof, a tail board pivoted on the rear of the body, links connecting the tail board to the arms, and reach rods extending from the projections to the arms whereby when the body is tilted the tail board is swung to open position.

LEONARD N. SPEARING.
WILLIAM HYVARI.

REFERENCES CITED

The following references are of record in the file of this patent:

UNITED STATES PATENTS

| Number | Name | Date |
|---|---|---|
| 43,549 | Ricketson et al. | July 12, 1864 |
| 1,390,122 | Gilbert | Sept. 6, 1921 |
| 2,103,866 | Norris | Dec. 28, 1937 |

FOREIGN PATENTS

| Number | Country | Date |
|---|---|---|
| 4,263 | Great Britain | of 1884 |
| 323,565 | France | of 1902 |
| 304,328 | Italy | of 1932 |
| 753,603 | France | of 1933 |